United States Patent
Hoar et al.

(10) Patent No.: US 7,123,583 B2
(45) Date of Patent: Oct. 17, 2006

(54) DUAL USE RATE POLICER AND RE-MARKING LOGIC

(75) Inventors: Andrew V. Hoar, Wilton, NH (US); Gregory S. Lauer, Sudbury, MA (US); Robert J. Walsh, Ashland, MA (US); Walter C. Milliken, Dover, NH (US); Todd A. Snide, Pelham, NH (US)

(73) Assignee: Ericsson AB, Stockholm (SE)

( * ) Notice: Subject to any disclaimer, the term of this patent is extended or adjusted under 35 U.S.C. 154(b) by 830 days.

(21) Appl. No.: 10/051,198

(22) Filed: Jan. 18, 2002

(65) Prior Publication Data

US 2002/0097677 A1 Jul. 25, 2002

Related U.S. Application Data

(60) Provisional application No. 60/264,156, filed on Jan. 25, 2001.

(51) Int. Cl.
*H04J 1/16* (2006.01)

(52) U.S. Cl. .................... 370/230; 370/235.1
(58) Field of Classification Search ........ 370/230–236, 370/252, 395.21
See application file for complete search history.

(56) References Cited

U.S. PATENT DOCUMENTS

| | | | | |
|---|---|---|---|---|
| 5,831,971 A | * | 11/1998 | Bonomi et al. | 370/230 |
| 6,141,686 A | | 10/2000 | Jackowski et al. | 709/224 |
| 6,147,970 A | | 11/2000 | Troxel | 370/235 |
| 6,205,149 B1 | * | 3/2001 | Lemaire et al. | 370/401 |
| 6,219,352 B1 | | 4/2001 | Bonomi et al. | 370/417 |
| 6,247,061 B1 | * | 6/2001 | Douceur et al. | 709/240 |
| 6,249,519 B1 | | 6/2001 | Rangachar | 370/356 |
| 6,349,089 B1 | | 2/2002 | Bonomi et al. | 370/230.1 |
| 6,405,251 B1 | | 6/2002 | Bullard et al. | 709/224 |
| 6,614,790 B1 | * | 9/2003 | Veres et al. | 370/395.2 |
| 6,862,270 B1 | * | 3/2005 | Ho | 370/328 |
| 6,950,395 B1 | * | 9/2005 | Bashandy et al. | 370/230.1 |

FOREIGN PATENT DOCUMENTS

WO   WO/00/25463   5/2000

* cited by examiner

*Primary Examiner*—Andrew C. Lee
(74) *Attorney, Agent, or Firm*—Ansel M. Schwartz

(57) ABSTRACT

A method for performing rate policing and re-marking in a packet switched communications network that can be used to enforce and/or monitor Class of Services (CoS) contracts including terms for single or multiple classes of service. A switching system configured as an ingress node on the network includes a network switch and rate policing and re-marking logic. The switch receives a data packet transmitted on the network, extracts information from at least one header field of the packet including a CoS parameter, a primary flow ID established for the packet, and a packet byte count, and provides the extracted information to the rate policing/re-marking logic. Next, the rate policing/re-marking logic performs flow record and token bucket processing on the primary packet flow to determine whether the packets of the primary flow conform to the bandwidth requirements specified in the CoS contract. In the event the primary flow is a sub-flow of an aggregated packet flow, the logic also performs flow record and token bucket processing on the aggregated flow to determine whether the packets of the aggregated flow comply with the terms of the CoS contract. The logic then provides the token bucket processing results to the switch. Based on these results, the switch may pass the packet unmodified on the network, pass the packet re-marked with a new CoS on the network, or drop the packet from the network.

13 Claims, 10 Drawing Sheets

```
Label: GetNextPacket      // From Packet Header Input
B = PacketByteCount
CCOS = ClassofServiceofPacket
NCCOS = NewClassofService
NCCOS = CCOS // Use PrimaryFlowID to look-up primary token bucket flow record and
// AggregatedFlowID
PTB = TokenBucket(PrimaryFlowID)
ATB = TokenBucket(AggregatedFlowID)
ATP = ActionTablePointer(PrimaryFlowID)
V = ValidBit(PrimaryFlowID)
AFID = AggregatedFlowID(PrimaryFlowID)

// Use the ATP to get the current action table entry
AT1 = ActionTableLow(ATP)  // Primary Action Table Entry
UseNewCos = ActionTableNew(ATP)  // Action Table New Bit
AT2 = ActionTableHigh(ATP)  // Aggregated Action Table Entry // Perform the primary token bucket test
If PTB - B < 0;
        If Drop(AT1, CCOS) = True;
                Drop the packet;
                go to GetNextPacket;
        else
                NCCOS = NewCCOS(AT1, CCOS);
                If WholeNumber(AT1, CCOS) = False;
                        PTB = PTB - B;
else
        PTB = PTB - B;
```

*Fig. 13a*

```
// Check the valid bit of the AggregatedFlowID
If V = False;
        Write NCCOS into egressPacketHeader;
        go to GetNextPacket;
else    // Use AggregatedFlowID to look-up aggregated token bucket
        // flow record
        If UseNewCCOS = True;
                CCOS = NCCOS;
        // Perform the aggregated token bucket test
        If ATB - B <0;
                If Drop(AT2, CCOS) = True;
                        Drop the packet;
                        go to GetNextPacket;
                else
                        NCCOS = NewCCOS(AT2, CCOS)
                        If WholeNumber(AT2, CCOS) = False;
                                ATB = ATB - B;
        else
                ATB = ATB - B;
        Write NCCOS into egressPacketHeader;
        go to GetNextPacket;
```

*Fig. 13b*

DUAL USE RATE POLICER AND RE-MARKING LOGIC

CROSS REFERENCE TO RELATED APPLICATIONS

This application claims priority of U.S. Provisional Patent Application No. 60/264,156 filed Jan. 25, 2001 entitled DUAL USE RATE POLICER AND RE-MARKING LOGIC.

STATEMENT REGARDING FEDERALLY SPONSORED RESEARCH OR DEVELOPMENT

N/A

BACKGROUND OF THE INVENTION

The present invention relates generally to communications systems, and more specifically to a dual use rate policing and re-marking apparatus for packet switched communications networks.

A conventional communications system includes a plurality of nodes interconnected by a plurality of data transmission paths to form at least one communications network. The plurality of nodes includes at least one node configurable as an ingress node for originating a data path and at least one node configurable as an egress node for terminating a data path through the network. Each node on the network typically comprises a computerized device such as a switch that can be used to interconnect two or more of the plurality of data paths. Each switch includes at least one input port and at least one output port coupled to respective data paths and is typically configured to allow each output port to receive digital data in the form of, e.g., data packets from any input port. The switch determines the appropriate output port for a particular packet by accessing information contained in a header field of the packet.

In the conventional communications system, a Class of Services (CoS) contract is typically formed between an operator of the communications network and a user of the network specifying the user's parameters for transmitting data on the network. For example, the CoS contract may specify that the user has a 500 kilobyte/second (KB/s) bandwidth for transmitting packets on the network. Further, each switch that constitutes an ingress node on the communications network may be configured to police data traffic on the network to assure that the network's users are in compliance with the terms of their respective CoS contracts. For example, each switch constituting an ingress node may include at least one queue configured to buffer a user's packet flow for a particular class of service. The switch typically determines the required class of service for each packet in the flow by accessing information in the packet header field. The switch may also include at least one token bucket associated with the queue for metering the buffered packet flow to determine whether the packets conform to the bandwidth requirements of the CoS contract. In the event it is determined that the user's packets conform to the terms of the CoS contract, the switch typically allows the packets to pass on the network via the appropriate output port(s). In the event at least one of the user's packets fails to comply with the CoS contract terms, the switch may mark the packet as non-conforming or simply drop the non-conforming packet from the network.

One drawback of conventional communications systems is that the network switches included therein cannot easily enforce CoS contracts that include terms for multiple classes of service. For example, a CoS contract may specify that a user of the communications network has a 500 KB/s bandwidth for a first packet flow, a 250 KB/s bandwidth for a second packet flow, a 200 KB/s bandwidth for a third packet flow, a 100 KB/s bandwidth for a fourth packet flow, and a total bandwidth of 1 megabyte/second (MB/s) for an aggregated packet flow comprising a mix of the multiple classes of service. Policing such a CoS contract can be problematic not only because the network switches are required to police the primary packet flows but also because the switches must police one or more aggregated flows. Further, a switch's ultimate disposition of a packet, e.g., whether the switch passes the packet, marks the packet as non-conforming, or drops the packet from the network, can depend not only on the specified data transmission rate for the corresponding primary packet flow but also on the amount of bandwidth currently available in the aggregated flow. This can further complicate the policing and enforcement of CoS contracts.

It would therefore be desirable to have an apparatus and method for policing CoS contracts of users of a communications network. Such an apparatus would be capable of policing CoS contracts that include terms for one or more classes of service. It would also be desirable to have an apparatus for policing CoS contracts that can appropriately re-mark packets with new CoS parameters to reduce data loss and assure that as much data traffic as possible is allowed to pass on the network.

BRIEF SUMMARY OF THE INVENTION

In accordance with the present invention, an apparatus and method for performing rate policing and re-marking in a packet switched communications network is disclosed that can be used to enforce and/or monitor Class of Services (CoS) contracts including terms for single or multiple classes of service. Benefits of the presently disclosed rate policing and re-marking apparatus are achieved by providing dual use rate policing and re-marking logic that combines flow record and token bucket processing to allow rate policing and re-marking of both primary and aggregated packet flows.

In one embodiment, a network switch and the dual use rate policing and re-marking logic are provided within a switching system configured as an ingress node on the communications network. The switch receives at least one data packet transmitted on the network, extracts information from at least one header field of the packet including at least one Ingress CoS (ICoS) parameter, an identifier of a primary flow (the "primary flow ID") established for the packet, and a packet byte count, and provides the extracted header information to the rate policing/re-marking logic. Next, the rate policing/re-marking logic performs flow record and token bucket processing on the primary packet flow to determine whether the packets of the primary flow conform to the bandwidth requirements specified in the respective ICoS contract. In the event the primary flow is a sub-flow of at least one aggregated packet flow, the rate policing/re-marking logic also performs flow record and token bucket processing on the aggregated flow to determine whether the packets of the aggregated flow comply with the terms of the ICoS contract. Based on the token bucket processing results, the rate policing/re-marking logic provides an indication of an appropriate action to the switch. Such actions may include passing the packet unmodified on the network, passing the packet re-marked with a new egress CoS (ECoS), or dropping the packet from the network. The switch then performs the indicated action on the packet.

The dual use rate policing and re-marking logic comprises an input configurable to receive the packet header information from the switch, an output configurable to pass the packet disposition information to the switch, a flow record processor configured to perform flow record and token bucket processing on the primary flow and any aggregated flow established for the packet, a flow record memory configured to store a respective flow record for each established primary and aggregated flow, a token bucket addend memory configured to store respective token bucket addend and maximum values, and a statistics memory configured to store token bucket processing statistics for system-level use.

The flow record processor includes a flow record processor control unit, a token bucket processor, a token bucket update control unit, an aggregated flow identifier (the "aggregated flow ID") look-up table, and an action table. The flow record processor control unit is configured to control the operation of the rate policing/re-marking logic by receiving the packet header information from the switch via the logic input, coordinating the activities of the token bucket processor and the token bucket update control unit based on the received packet header information, and passing the resulting packet disposition information to the switch via the logic output. Each flow record stored in the flow record memory includes a pointer to a location in the action table and a token bucket value for a particular packet flow. Further, each token bucket addend and maximum value pair stored in the token bucket addend memory corresponds to respective addend and maximum values for a particular token bucket value.

The token bucket processor is configured to execute mathematical operations required for the token buckets of the primary and aggregated packet flows. The token bucket processor may subtract the packet byte count from the corresponding token bucket value, periodically add the addend value to the token bucket value, and compare the resulting token bucket value to the corresponding maximum value to ascertain whether the maximum value of the token bucket has been exceeded. In the event the sign of the token bucket value is negative after subtracting the packet byte count, it may be concluded that the packet does not conform to the bandwidth requirements specified in the respective ICoS contract. In the event the token bucket value remains non-negative after the subtraction operation, it may be concluded that the packet complies with the terms of the ICoS contract and the new token bucket value for the packet flow may then be stored in the appropriate location of the flow record memory. Next, the token bucket processing results are provided to the flow record processor control unit, which passes corresponding packet disposition information to the switch for subsequent disposition of the packet.

The token bucket update control unit is configured to update the token bucket values stored in the flow record memory using the corresponding token bucket addend and maximum values stored in the token bucket addend memory. The token bucket update control unit includes a programmable interval counter that determines a time interval between successive token bucket updates, and a flow ID counter that provides output values corresponding to the primary and aggregated packet flow IDs. Each time the interval counter expires, the token bucket update control unit sends read requests to the flow record memory and the token bucket addend memory. The output value provided by the flow ID counter serves as the read address for the flow record memory and the token bucket addend memory. The flow record and token bucket addend memories then provide the corresponding token bucket and addend/maximum values, respectively, to the token bucket update control unit, which in turn provides these values to the token bucket processor. Next, the token bucket processor adds the addend value to the token bucket value and compares the resulting token bucket value to the corresponding maximum value. In the event the resulting token bucket value is less than or equal to the maximum value, the token bucket processor stores the new token bucket value for the packet flow in the appropriate location of the flow record memory. In the event the resulting token bucket value is greater than the maximum value, the token bucket processor stores the maximum value as the new token bucket value.

The aggregated flow ID look-up table is configured to store at least one aggregated flow ID for each primary flow. The primary flow ID serves as a pointer to a location in the aggregated flow ID look-up table where the corresponding aggregated flow ID is stored. Further, the aggregated flow ID serves as the read address in the flow record memory where the action table pointer and the token bucket value for the corresponding aggregated flow are stored. In the event the aggregated flow ID look-up table stores a valid aggregated flow ID for the primary flow, the token bucket processor performs token bucket processing for the aggregated flow and provides the token bucket processing results to the flow record processor control unit, which passes corresponding packet disposition information to the switch for subsequent disposition of the packet.

The action table is configured to store representations of a plurality of addressable actions for each primary and aggregated flow that define the ultimate disposition of each packet not conforming to the requirements of the respective ICoS contract. The plurality of addressable actions includes re-marking the packet with a new ECoS parameter and dropping the packet from the network. Based at least on the ICoS parameters for the non-conforming packet, the flow record processor control unit accesses a representation of an appropriate action from the action table and provides corresponding packet disposition information to the switch, which subsequently performs the indicated action on the packet.

In the disclosed embodiment, single or multiple levels of operations may be performed by the rate policing/re-marking device on each data packet. The rate policing/re-marking logic may be configured to perform single-level operations such as single-level policing, single-level re-marking, and single-level accounting, and/or multi-level operations such as two-level policing, two-level re-marking, two-level policing/re-marking, and two level accounting.

The rate policing/re-marking logic may be configured to perform single-level policing, re-marking, and/or accounting operations to enforce and/or monitor compliance with ICoS contracts that include terms for single classes of service. Such ICoS contracts are generally associated with primary packet flows. Further, the rate policing/re-marking logic may be configured to perform multi-level policing, re-marking, and/or accounting operations to enforce and/or monitor compliance with ICoS contracts that include terms for multiple classes of service. Such ICoS contracts are generally associated with primary packet flows that are sub-flows of one or more aggregated packet flows, in which each of the primary and aggregated flows must comply with the parameters of a particular class of service.

By providing the dual use rate policing and re-marking logic configured to combine flow record and token bucket processing for both primary and aggregated packet flows, network switches can more easily enforce CoS contracts that include terms for single or multiple classes of service.

Other features, functions, and aspects of the invention will be evident from the Detailed Description of the Invention that follows.

BRIEF DESCRIPTION OF THE SEVERAL VIEWS OF THE DRAWING

The invention will be more fully understood with reference to the following Detailed Description of the Invention in conjunction with the drawings of which:

FIGS. 13a–13b depict a pseudo code representation of a method of performing rate policing and re-marking in a communications network using the dual use rate policing and re-marking logic of FIG. 3.

DETAILED DESCRIPTION OF THE INVENTION

U.S. Provisional Patent Application No. 60/264,156 filed Jan. 25, 2001 is incorporated herein by reference.

A method of performing rate policing and re-marking in a packet switched communications network is provided that can be used to police packet flows on the network for contract enforcement and billing purposes. Such policing of packet flows is achieved by providing dual use rate policing and re-marking logic that combines flow record and token bucket processing to allow rate policing and re-marking of data packets transmitted on the network in both primary and aggregated packet flows.

Figure 1:
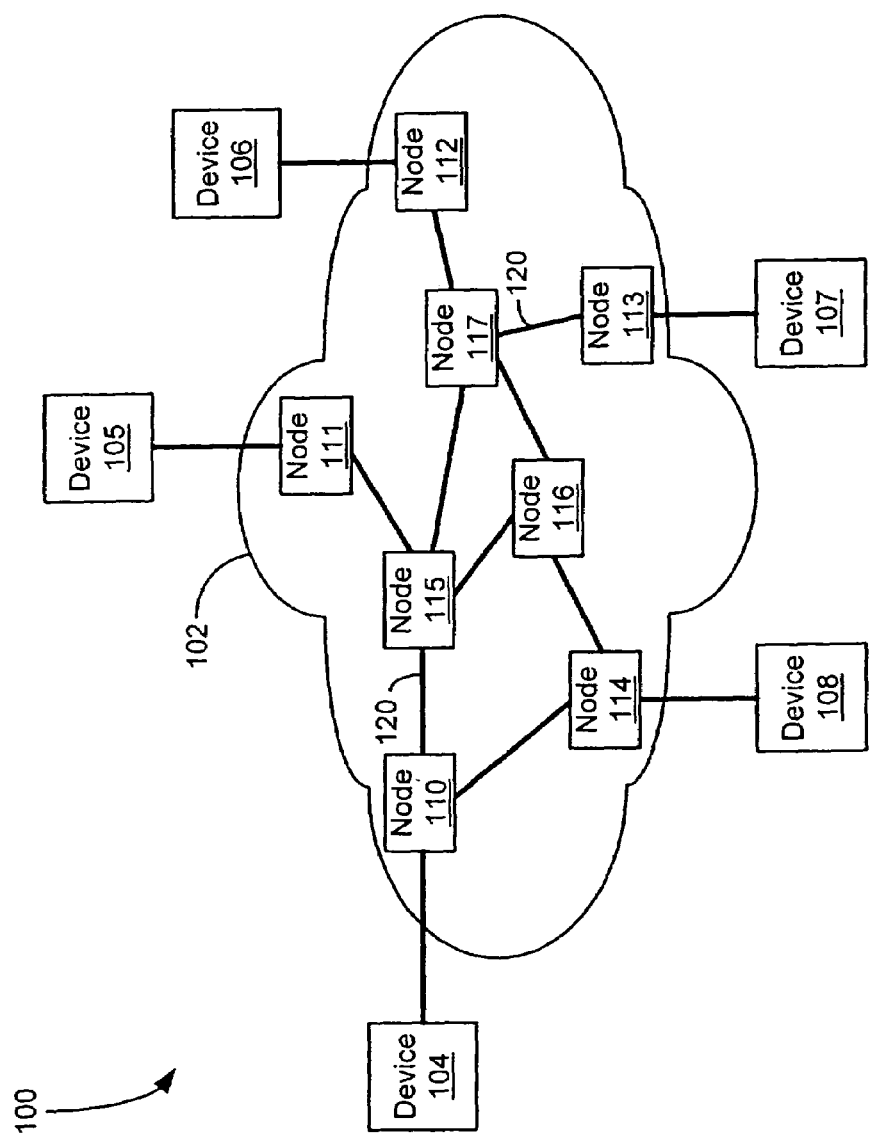
FIG. 1 is a block diagram depicting a communications system including at least one ingress node according to the present invention.

FIG. 1 depicts an illustrative embodiment of a communications system 100 comprising a communications network 102 that includes at least one ingress node configured to perform rate policing and re-marking of packets transmitted on the network 102, in accordance with the present invention. For example, the network 102 may comprise at least one packet switched communications network. In the illustrated embodiment, the network 102 includes a plurality of nodes 110–117 interconnected by a plurality of data transmission paths 120. The plurality of nodes 110–117 includes at least one ingress node configured to originate a data path and at least one egress node configured to terminate a data path through the network 102. For example, the network 102 may be configured to establish a packet flow for one or more packets transmitted from a source device 104 coupled to the network 102 at the node 110 to a destination device 105 coupled to the network 102 at the node 111. Accordingly, the node 110 may be configured as an ingress node and the node 111 may be configured as an egress node for transmitting packets from the source device 104 to the destination device 105 via at least one data path traversing one or more of the intermediate nodes 115–117.

It is understood that packets may be similarly transmitted on the network 102 between any two or more of a plurality of devices 104–108 via an ingress node and at least one egress node on the network 102. Accordingly, each of the nodes 110–114 is configurable as an ingress node or an egress node for transmitting packets between two or more of the devices 104–108 via at least one data path traversing one or more of the intermediate nodes 115–117.

For example, each of the nodes 110–117 on the network 102 may comprise a network device such as a router or network switch. Further, each of the devices 104–108 may comprise a computer system such as a client, a server, or a gateway to another network. Moreover, the network 102 may comprise a Local Area Network (LAN), a Wide Area Network (WAN), a global computer network such as the Internet, or any other network configured to communicably couple the devices 104–108 to one another.

Those of ordinary skill in the art will appreciate that a Class of Services (CoS) contract may be formed between an operator of a communications network and a user of the network specifying the user's parameters for transmitting data on the network. For example, the user of the network 102 may be the user of the device 104 coupled to the network 102 at the node 110. Further, the CoS contract may indicate that the user of the device 104 has a 500 kilobyte/second (KB/s) bandwidth for a first packet flow, a 250 KB/s bandwidth for a second packet flow, a 200 KB/s bandwidth for a third packet flow, a 100 KB/s bandwidth for a fourth packet flow, and a total bandwidth of 1 megabyte/second (MB/s) for an aggregated packet flow comprising a mix of the multiple classes of service. Accordingly, the user of the device 104 may transmit packets at or below the data transmission rates indicated in the CoS contract or in bursts so long as the bandwidth requirements of the CoS contract are not exceeded over time.

Figure 2:
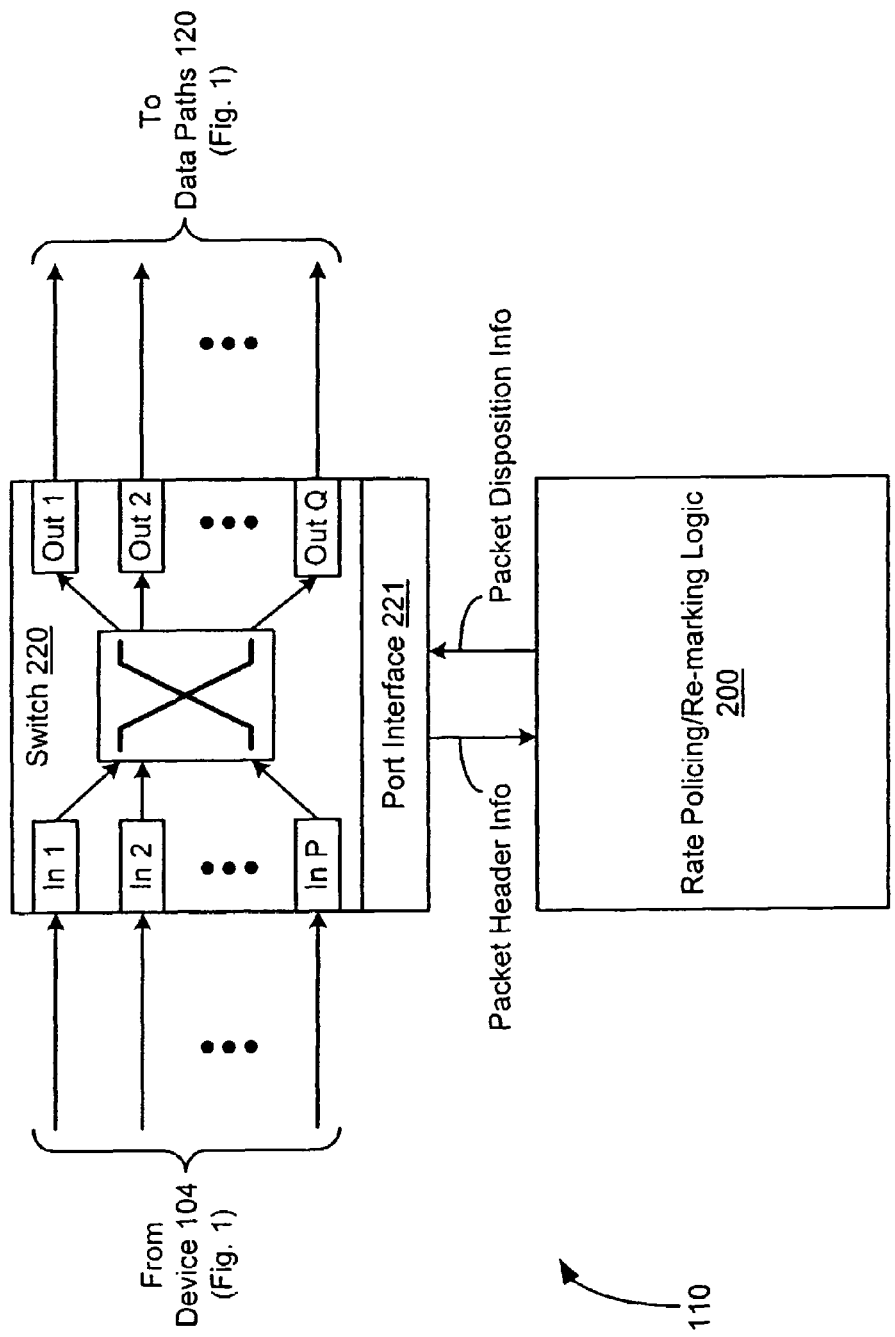
FIG. 2 is a block diagram depicting an illustrative embodiment of a switching system constituting the ingress node of FIG. 1.

FIG. 2 depicts an illustrative embodiment of an ingress node such as the node 110 on the communications network 102 (see FIG. 1). Because the nodes 111–114 are configurable as ingress nodes to receive packets from corresponding devices 104–108 communicably coupled thereto for subsequent transmission on the network 102, each of the nodes 111–114 may be configured like the node 110 of FIG. 2.

As shown in FIG. 2, the ingress node 110 comprises a switching system including a switch 220 and dual use rate policing and re-marking logic 200. The switch 220 includes one or more input ports 1-P communicably coupled to the device 104 and one or more output ports 1-Q coupled to at least one data path 120 in the network 102 (see FIG. 1). In the illustrated embodiment, the switch 220 is configured to allow each of the output ports 1-Q to receive digital data in the form of packets from any one of the input ports 1-P. For example, the switch 220 may determine the appropriate output port(s) 1-Q for a particular packet by extracting information contained in a header field of the packet. The switch 220 may also include at least one queue (not shown) configured to buffer a user's packet flow for a particular class of service. For example, the switch 220 may include a high-priority queue configured to buffer packet flows for a constant bit-rate service class and a low-priority queue configured to buffer packet flows for a "best-effort" service class.

The switching system 110 polices data traffic received from the source device 104 via the input ports 1-P to ascertain whether the user of the device 104 is in compliance with the terms of the respective CoS contract. Specifically, the rate policing and re-marking logic 200 is configured to receive information extracted from the header field of a packet received at one of the input ports 1-P via a port interface 221, determine whether the packet conforms to the bandwidth requirements specified in the CoS contract using the packet header information, and provide packet disposition information to the switch 220 via the port interface 221 indicating an appropriate action to take on the packet. Based on the packet disposition information provided by the rate policing/re-marking logic 200, the switch 220 may pass the packet unmodified on the network 102 (see FIG. 1), pass the packet re-marked with at least one new CoS parameter, or drop the packet from the network 102.

Figure 3:
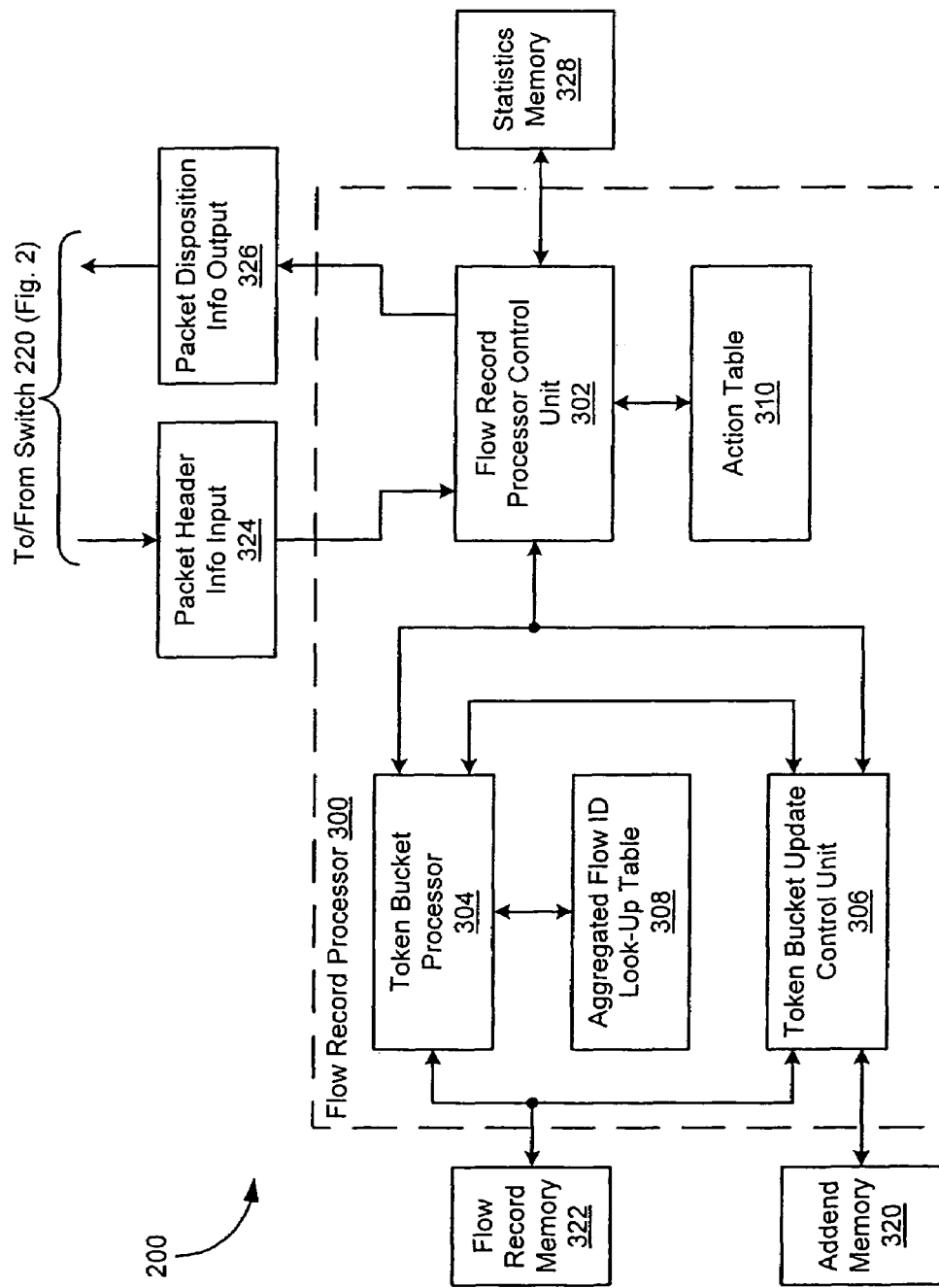
FIG. 3 is a block diagram depicting an illustrative embodiment of dual use rate policing and re-marking logic included in the switching system of FIG. 2.

FIG. 3 depicts an illustrative embodiment of the dual use rate policing/re-marking logic 200 included in the switching system 110 (see FIG. 2). In the illustrated embodiment, the rate policing/re-marking logic 200 includes a packet header information input 324 configured to receive the packet header information from the switch 220 and a packet disposition information output 326 configured to pass the packet disposition information to the switch 220. The rate policing/re-marking logic 200 further includes a flow record processor 300 configured to receive the packet header information from the input 324, perform a combination of flow record and token bucket processing using the packet header information, and provide the packet disposition information to the output 326 based on the token bucket processing results.

Specifically, when the switch 220 receives a packet at one of the input ports 1-P (see FIG. 2), the switch 220 extracts information from at least one header field of the incoming packet including at least one Ingress CoS (ICoS) parameter for the packet, an identifier of the primary flow (the "primary flow ID") established for the packet, and an indication of the length of the packet (e.g., the packet byte count), and provides this packet header information to the input 324 (see FIG. 3).

Figure 4:
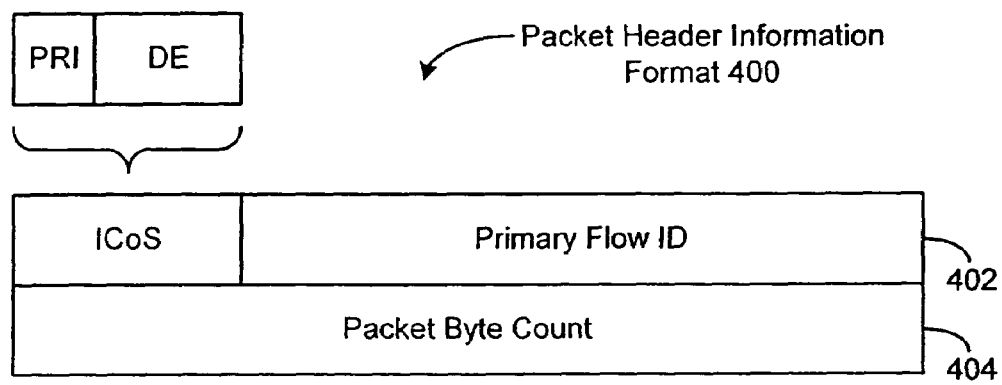
FIG. 4 depicts an illustrative format for packet header information.

FIG. 4 depicts an illustrative format 400 for the packet header information provided by the switch 220 to the input 324 (see FIG. 3). In the illustrated format, the packet header information comprises two (2) consecutive words 402 and 404. The first word 402 includes a field containing the primary flow ID and a field containing the ICoS parameters. The ICoS field includes a Discard Eligibility (DE) field and a Priority (PRI) bit, the functions of which are described below. The second word 404 includes the packet byte count.

A flow ID is a number assigned to a packet flow and is generally used to associate one or more packets in the flow with data traffic belonging to a particular network user. It should be understood that a packet flow may have one or more flow IDs assigned thereto. For example, a primary packet flow may be part of an aggregated packet flow and may therefore have both a primary flow ID and an aggregated flow ID assigned thereto. Further, a primary flow ID assigned to a first flow may serve as an aggregated flow ID for one or more second flows. Moreover, although each primary packet flow typically has a unique primary flow ID, a plurality of primary flows may share the same aggregated flow ID.

In the presently disclosed embodiment, the packet header information input 324 (see FIG. 3) includes a First-In First-Out (FIFO) buffer (not shown) configured to buffer the extracted packet header information provided by the switch 220. The input 324 passes the buffered packet header information to the flow record processor 300 (see FIG. 3) for subsequent flow record and token bucket processing.

The flow record processor 300 includes a flow record processor control unit 302, a token bucket processor 304, a token bucket update control unit 306, an aggregated flow identifier (the "aggregated flow ID") look-up table 308, and an action table 310. The flow record processor 300 is configured to receive the packet header information from the input 324, perform flow record and token bucket processing using the received packet header information, and pass the resulting packet disposition information to the switch 220 (see FIG. 2) via the output 326.

Figure 5:
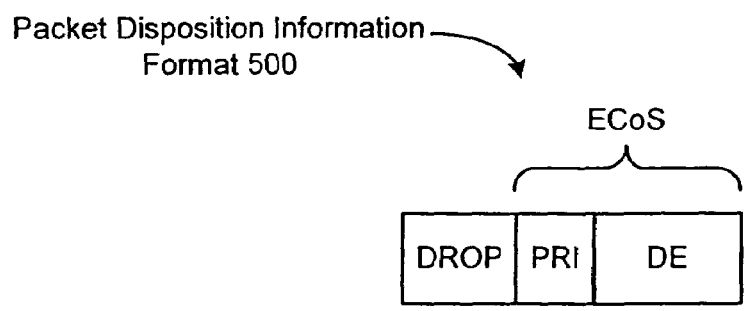
FIG. 5 depicts an illustrative format for packet disposition information.

FIG. 5 depicts an illustrative format 500 for the packet disposition information provided to the switch 220 by the flow record processor 300 (see FIG. 3). In the illustrated format, the packet disposition information includes an Egress CoS (ECoS) field and a Drop bit. Like the ICoS field, the ECoS field includes a DE field and a PRI bit. In the event the flow record processor 300 determines that a packet is conforming and should be passed unmodified on the network, the flow record processor 300 fills the ECoS field with data from the ICoS field (see FIG. 4) and de-asserts the Drop bit. In the event the flow record processor 300 determines that the packet is non-conforming and should be dropped from the network, the flow record processor 300 asserts the Drop bit. Because the flow record processor 300 performs token bucket processing on packets in the order in which they arrive, there is no need to include the corresponding flow ID in the packet disposition information.

Figure 6:
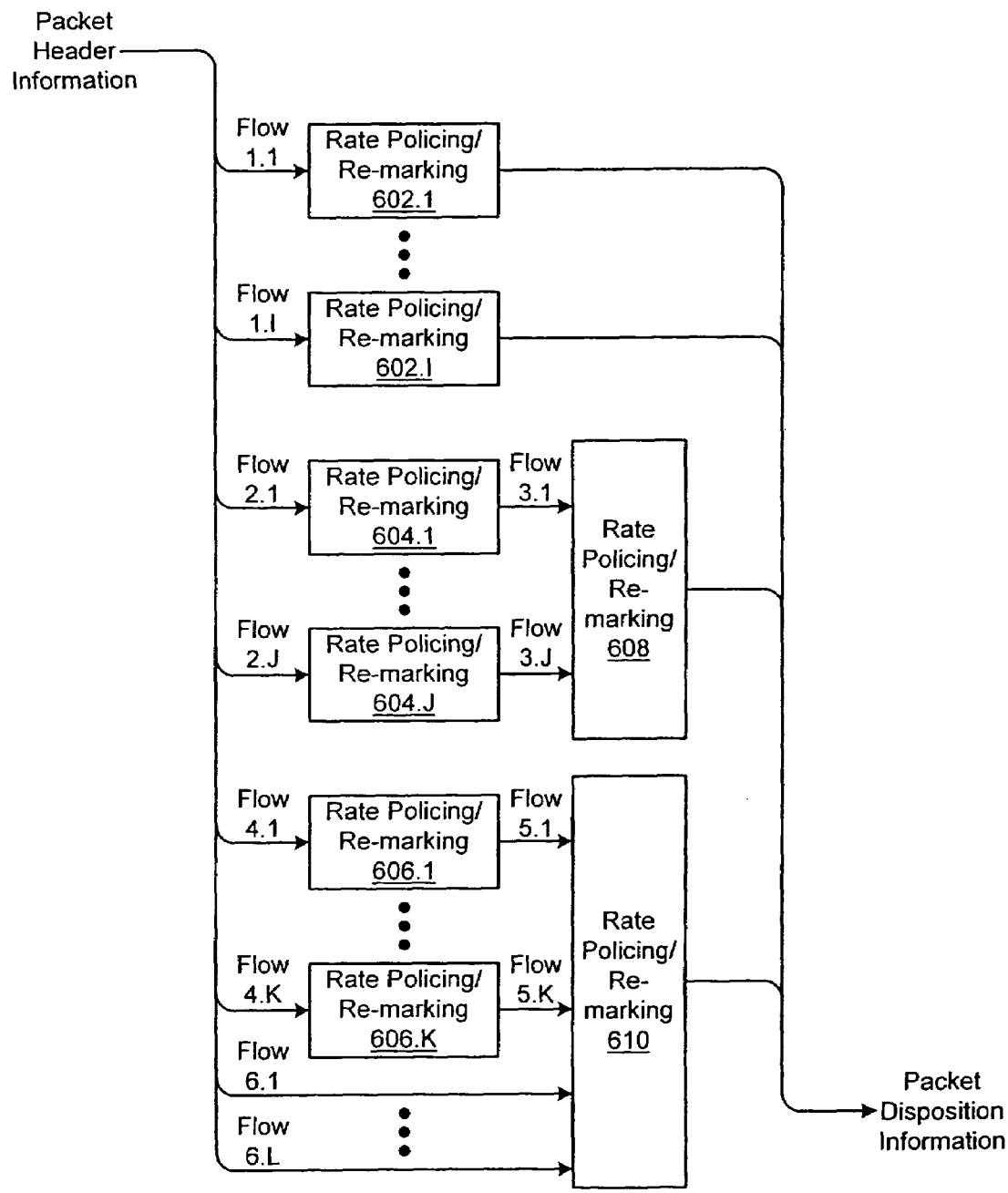
FIG. 6 is a block diagram representing exemplary process blocks for the dual use rate policing and re-marking logic of FIG. 3.

FIG. 6 depicts exemplary process blocks that may be performed by the flow record processor 300 (see FIG. 3) to police data traffic. For example, the data traffic may comprise at least one packet in one or more primary packet flows. Accordingly, as shown in FIG. 6, packet header information corresponding to primary packet flows 1.1–1.I may be provided to rate policing/re-marking process blocks 602.1–602.I, which then perform a single level of rate policing/re-marking operations on the primary packet flows 1.1–1.I to generate packet disposition information. Next, the rate policing/re-marking process blocks 602.1–602.I provide the packet disposition information to the switch 220 (see FIG. 2) for subsequent disposition of the packets.

The data traffic may further comprise a plurality of primary packet flows that are sub-flows of an aggregation of secondary packet flows. Accordingly, as shown in FIG. 6, packet header information corresponding to primary packet flows 2.1–2.J may be provided to rate policing/re-marking process blocks 604.1–604.J, which then perform a first level of rate policing/re-marking operations on the primary flows 2.1–2.J to generate packet disposition information for the flows 2.1–2.J. Next, the rate policing/re-marking process blocks 604.1–604.J provide packet header information corresponding to secondary packet flows 3.1–3.J to a rate policing/re-marking process block 608, which performs a second level of rate policing/re-marking operations on the aggregated flows 3.1–3.J to generate packet disposition information for the flows 3.1–3.J. The rate policing/re-marking process block 608 then provides the packet disposition information for the aggregated flows 3.1–3.J to the switch 220 for subsequent disposition of the packets.

Moreover, the data traffic may comprise a plurality of primary packet flows that are sub-flows of a first aggregation of secondary packet flows, and one or more primary packet flows that are sub-flows of a second aggregation of packet flows including the first aggregation of flows. Accordingly, packet header information corresponding to primary packet flows 4.1–4.K may be provided to rate policing/re-marking process blocks 606.1–606.K, which then perform a first level of rate policing/re-marking operations on the primary flows 4.1–4.K to generate packet disposition information for the flows 4.1–4.K.

Next, the rate policing/re-marking process blocks 606.1–606.K provide packet header information corresponding to secondary flows 5.1–5.K to a rate policing/re-marking process block 610. Further, packet header information corresponding to primary packet flows 6.1–6.L may be provided to the rate policing/re-marking process block 610, which performs a second level of rate policing/re-marking operations on the aggregated flows 5.1–5.K and 6.1–6.L to generate packet disposition information for the flows 5.1–5.K and 6.1–6.L. The rate policing/re-marking process block 610 provides the packet disposition information for the aggregated flows 5.1–5.K and 6.1–6.L to the switch 220 for subsequent disposition of the packets. It should be appreciated that the flow record processor 300 may be configured to police alternative aggregations of primary and/or secondary packet flows.

It is noted that the total available bandwidth for an aggregated flow may be substantially less than the sum of the bandwidths for the primary flows that are sub-flows of the aggregated flow. In this case, rate policing and re-marking of the primary and aggregated flows may be performed using "fair queuing". For example, the switch 220 (see FIG. 2) may be configured to scan the plurality of primary flows at the input ports 1-P "round robin" by sequentially taking the first packet from each primary flow and performing rate policing and re-marking on that packet. Such fair queuing may alternatively be performed on a byte-by-byte basis instead of packet-by-packet. Moreover, because the switch 220 may buffer the primary flows for different service classes, rate policing and re-marking of the primary and aggregated flows may be performed using "weighted fair queuing". For example, the switch 220 may be configured to scan the buffered primary flows and take more packets from the flows that are buffered for high service classes than those buffered for low service classes. Other ways of implementing rate policing and re-marking of primary and aggregated flows on a fair basis are also possible.

The flow record processor control unit 302 (see FIG. 3) is configured to receive the packet header information comprising the ICoS parameter, the primary flow ID, and the packet byte count from the input 324, and provide the received primary flow ID and packet byte count to the token bucket processor 304, which fetches a flow record corresponding to the primary flow established for the packet from a flow record memory 322 using the primary flow ID as the read address.

Figure 7:
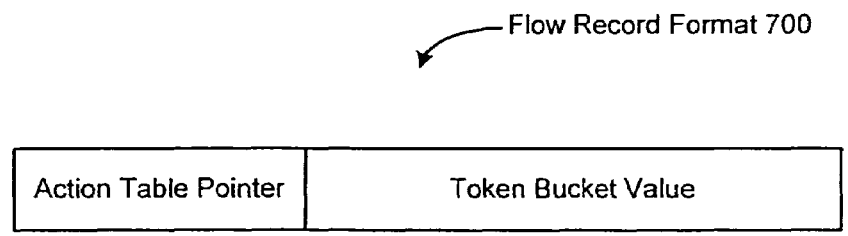
FIG. 7 depicts an illustrative format for a flow record.

FIG. 7 depicts an illustrative format 700 for the flow record fetched from the flow record memory 322 by the token bucket processor 304. In the illustrated format, the flow record includes a field containing a signed token bucket value for the packet flow, and a field containing a pointer to a location in an action table 310 (see FIG. 3), the function of which is described below.

The flow record processor control unit 302 further provides the primary flow ID to the token bucket update control unit 306, which fetches token bucket addend and maximum values for the primary flow from a token bucket addend memory 320 using the primary flow ID as the read address.

Figure 8:
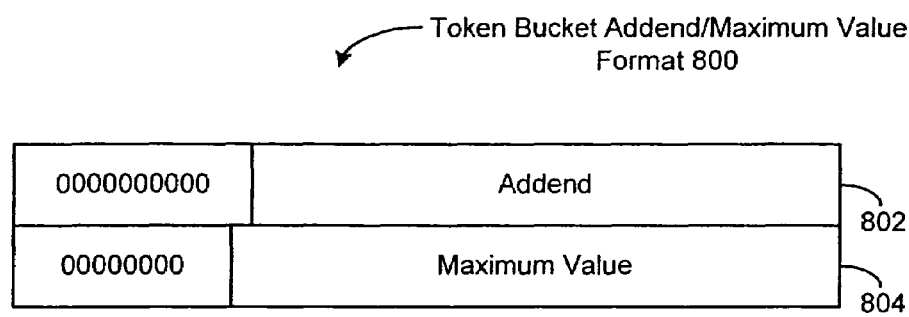
FIG. 8 depicts an illustrative format for a token bucket addend/maximum value.

FIG. 8 depicts an illustrative format 800 for the token bucket addend and maximum values fetched from the token bucket addend memory 320 by the token bucket update control unit 306. The illustrated token bucket addend/maximum value format 800 comprises two (2) consecutive words 802 and 804. The first word 802 includes a field containing the token bucket addend value, and the second word 804 includes a field containing the token bucket maximum value.

Moreover, the flow record processor control unit 302 provides at least one statistic related to the token bucket processing results to a statistics memory 328, which stores the statistic for system-level use.

Figure 9:
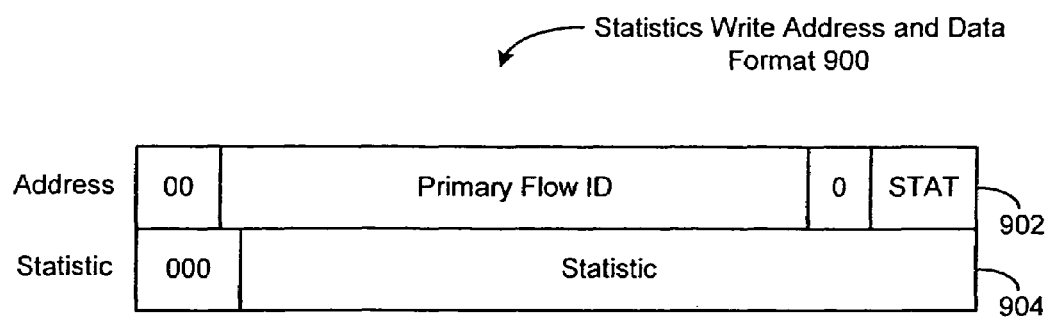
FIG. 9 depicts an illustrative format for a statistics memory address/data.

FIG. 9 depicts an illustrative format 900 for the statistic data and an address of the statistics memory 328 at which the statistic is stored. The illustrated statistics address and data format 900 includes a write address 902 and statistics data 904. The write address 902 includes a field containing the primary flow ID, and a STAT field that may be used to address one of a plurality of predetermined statistics such as the number of packets passed, the number of packets re-marked, the number of packets dropped from a respective primary flow, and the number of packets dropped from a respective aggregated flow. The statistics data 904 includes a field containing the statistic to be stored in the location of the statistics memory 328 pointed at by the write address 902. For example, the token bucket addend memory 320, the flow record memory 322, and the statistics memory 328 may comprise respective static Random Access Memories (RAMs).

The token bucket processor 304 (see FIG. 3) is configured to execute mathematical operations required to process the respective token buckets of the primary flow and any aggregated packet flow(s). A token bucket value for a packet flow generally corresponds to the total number of bytes that may be transmitted via the flow during a predetermined period of time. After receiving the primary flow ID and the packet byte count from the flow record processor control unit 302 and fetching the flow record corresponding to the primary flow from the flow record memory 322, the token bucket processor 304 subtracts the packet byte count from the corresponding token bucket value.

In the event the sign of the token bucket value is negative after subtracting the packet byte count, it is concluded that the packet does not conform to the bandwidth requirements for the primary flow specified in the ICoS contract. In the event the token bucket value remains non-negative after subtracting the packet byte count, it is concluded that the packet complies with the terms of the ICoS contract and the token bucket processor 304 stores the new token bucket value in the appropriate location of the flow record memory 322 for the primary flow. Next, the token bucket processor 304 determines whether the primary packet flow is a sub-flow of an aggregation of secondary packet flows by attempting to fetch a valid aggregated flow ID for the primary flow from the aggregated flow ID look-up table 308 using the primary flow ID as the read address. For example, the aggregated flow ID look-up table 308 and the action table 310 may comprise respective RAMs.

Figure 10:
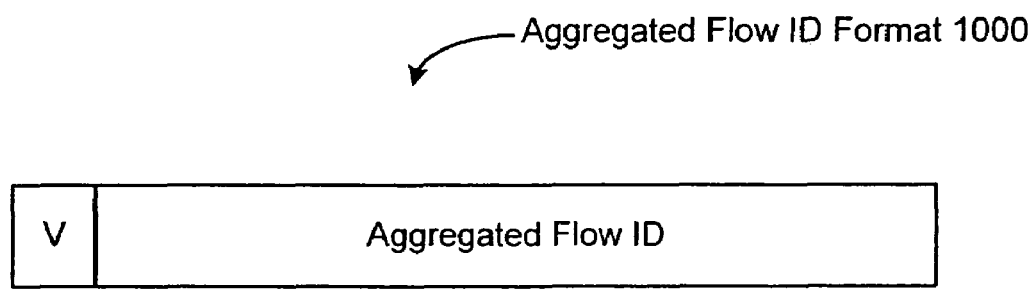
FIG. 10 depicts an illustrative format for an aggregated flow identifier.

FIG. 10 depicts an illustrative format 1000 for the aggregated flow ID fetched from the aggregated flow ID look-up table 308 by the token bucket processor 304. The illustrated aggregated flow ID format 1000 includes a field containing the aggregated flow ID and a Valid (V) bit. In the event the V bit is de-asserted, it is concluded that no aggregated flow exists for the primary flow. In the event the V bit is asserted, it is concluded that the primary flow is a sub-flow of an aggregated flow and the corresponding aggregated flow ID is contained in the aggregated flow ID field.

The token bucket processor 304 (see FIG. 3) fetches a flow record corresponding to the aggregated flow from the flow record memory 322 using the valid aggregated flow ID as the read address. In the presently disclosed embodiment, the flow record for the aggregated flow conforms to the flow record format 700 depicted in FIG. 7. The token bucket processor 304 then performs token bucket processing on the aggregated flow in a manner similar to that described above for the primary flow.

The token bucket update control unit 306 is configured for periodically updating the respective token bucket values stored in the flow record memory 322 using the corresponding token bucket addend and maximum values fetched from the token bucket addend memory 320. In the presently disclosed embodiment, the token bucket update control unit 306 includes a programmable interval counter (not shown) that determines a time interval between successive token bucket updates, and a flow ID counter (not shown) that provides output values corresponding to the primary and aggregated packet flow IDs. Each token bucket update operation comprises adding the token bucket addend value to the corresponding token bucket value and comparing the resulting token bucket value to the corresponding maximum token bucket value to ascertain whether the maximum value for that token bucket has been exceeded. For example, the maximum token bucket value may be used as a "clamp" value to prevent a packet flow with a bursting nature from temporarily saturating the network with sustained periods of activity. By controlling the frequency of the token bucket updates and the respective magnitudes of the token bucket addend and maximum values for a particular packet flow, the flow record processor 300 can enforce the bandwidth of the packet flow on the network.

Each time the interval counter expires, the token bucket update control unit 306 sends read requests to the token bucket addend memory 320 and the flow record memory 322 using the output value of the flow ID counter as the read address. The token bucket addend memory 320 then provides the corresponding token bucket addend and maximum values, and the flow record memory 322 provides the corresponding token bucket value, to the token bucket update control unit 306, which in turn provides these values to the token bucket processor 304. Next, the token bucket processor 304 adds the addend value to the token bucket value and compares the resulting token bucket value to the corresponding maximum token bucket value. In the event the resulting token bucket value is less than or equal to the corresponding maximum value, the token bucket processor 304 stores the new token bucket value in the appropriate location of the flow record memory 322. In the event the resulting token bucket value is greater than the corresponding maximum value, the token bucket processor 304 stores the maximum value as the new token bucket value.

It is noted that when the update of a token bucket value by the token bucket update control unit 306 coincides with the processing of a corresponding primary or aggregated flow by the token bucket processor 304, the update of the token bucket value can be combined with the processing of the corresponding packet flow. For example, the token bucket processor 304 may add the addend value to the token bucket value before subtracting the packet byte count from the token bucket value. This may cause some packets to be passed unmodified that might otherwise have been re-marked or dropped from the network but for the coinciding token bucket update operation.

The token bucket processor 304 provides the action table pointer for the primary or aggregated packet flow and an indication of whether the packet is conforming or non-conforming to the flow record processor control unit 302. In the event the packet conforms to the bandwidth requirements of the respective ICoS contract, the flow record processor control unit 302 fills the ECoS field of the packet disposition information with the data from the ICoS field (see FIG. 4) and de-asserts the Drop bit (see FIG. 5). In the event the packet fails to comply with the respective ICoS contract, the flow record processor control unit 302 determines the ultimate disposition of the non-conforming packet by accessing an appropriate action from the action table 310 (see FIG. 3).

The action table 310 is configured to store representations of a plurality of addressable actions for primary and aggregated flows that define the ultimate disposition of non-conforming packets in the respective flows. For example, the plurality of addressable actions may include re-marking a non-conforming packet with a new ECoS parameter and dropping a non-conforming packet from the network. The flow record processor control unit 302 uses the action table pointer and a selected CoS parameter as an offset to the action table pointer to fetch a representation of the action to be taken on the non-conforming packet from the action table 310, and provides packet disposition information indicative of that action to the output 326.

Figure 11:
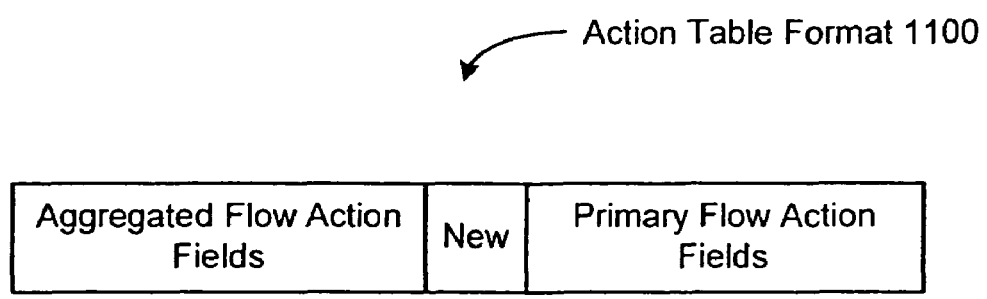
FIG. 11 depicts an illustrative format for an action table.

FIG. 11 depicts an illustrative format 1100 for the addressable actions stored in the action table 310 (see FIG. 3). The illustrated action table data format 1100 includes a field containing a plurality of primary flow action fields, a field containing a plurality of aggregated flow action fields, and a New bit, the function of which is described below.

Figure 12:
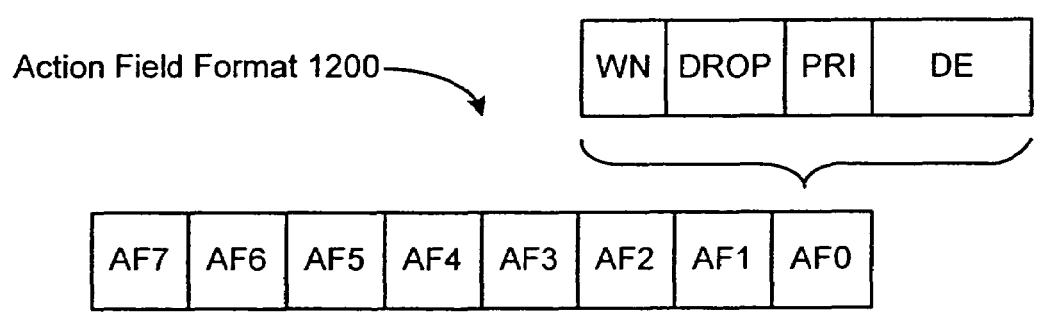
FIG. 12 depicts an illustrative format for an action field included in the action table of FIG. 11.

FIG. 12 depicts an illustrative format 1200 for the respective primary flow and aggregated flow action fields (see FIG. 11). As shown in FIG. 12, each action field is subdivided into a plurality of action fields AF0–AF7 containing representations of actions to be taken on non-conforming packets. It is noted that the total number of primary flow action fields may be different from the total number of aggregated flow action fields.

Each of the action fields AF0–AF7 of FIG. 12 is further subdivided into a Discard Eligibility (DE) field, a priority (PRI) bit, a Drop bit, and a Whole Number (WN) bit. In the illustrated format, the DE field contains the Least Significant Bits (LSBs) of a predetermined CoS parameter, and the PRI bit is the Most Significant Bit (MSB) of the predetermined CoS parameter. For example, the respective CoS parameters stored in the action fields AF0–AF7 may be used in re-marking non-conforming packets with new ECoS parameters. The Drop bit is asserted when the action to be taken on the non-conforming packet comprises dropping the packet from the network. Further, the WN bit is asserted when the action to be taken on the non-conforming packet comprises re-marking the packet and allowing the re-marked packet to pass on the network. In this case, the Drop bit is de-asserted. For example, a non-conforming packet may be re-marked with a new ECoS parameter that lowers its priority from, e.g., a high priority to a low priority to allow the non-conforming packet to be dropped more easily at a subsequent node on the network. This provides the communications system with a more flexible response to data traffic that arrives in short intense bursts but does not exceed the total bandwidth allotment over time.

In the presently disclosed embodiment, the ICoS parameter, i.e., the bits in the DE field and the PRI bit of the ICoS field (see FIG. 4), is used as an offset to the action table pointer for the primary flow to select the primary flow action field AF0–AF7 (see FIG. 12) containing the action to be taken on a non-conforming packet in the primary flow. In the event the primary flow is not a sub-flow of an aggregated flow, as indicated by the V bit in the aggregated flow ID format 1000 (see FIG. 10), the bits in the DE field and the PRI bit of the selected primary flow action field AF0–AF7 may be used as the new ECoS parameter when re-marking a non-conforming packet.

In the event the primary flow is a sub-flow of an aggregated flow and the New bit (see FIG. 11) is de-asserted, the DE and PRI bits of the ICoS field are used as an offset to the action table pointer for the aggregated flow to select the aggregated flow action field AF0–AF7 containing the action to be taken on a non-conforming packet in the aggregated flow. In the event the New bit is asserted, the DE and PRI bits of the previously selected primary flow action field AF0–AF7 are used as the offset to the action table pointer for the aggregated flow to select the appropriate aggregated flow action field AF0–AF7. As in the token bucket operation for the primary flow, the bits in the DE field and the PRI bit of the selected aggregated flow action field AF0–AF7 may be used as the new ECoS parameter when re-marking a non-conforming packet. The flow record processor control unit 302 then provides the packet disposition information with the appropriate bit values in the Drop and ECoS fields (see FIG. 5) to the switch 220, which subsequently performs the indicated action on the packet.

The presently disclosed embodiment will be better understood with reference to the following illustrative examples. In a first example, the rate policing/re-marking logic 200 (see FIG. 2) is configured to perform single-level rate policing of a packet in a primary flow received by the switch 220. In this example, the valid (V) bit in the aggregated flow ID format 1000 (see FIG. 10) is de-asserted, and the Drop bit in the primary flow action fields AF0–AF7 (see FIG. 12) is asserted. In the event the rate policing/re-marking logic 200 determines that the packet conforms to the requirements of the respective ICoS contract (i.e., the token bucket value for the primary flow remains non-negative after subtracting the packet byte count), the rate policing/re-marking logic 200 stores the new token bucket value in the appropriate location of the flow record memory 322 for the primary flow. Next, the rate policing/re-marking logic 200 de-asserts the Drop bit and uses the original ICoS data to fill the ECoS field in the packet disposition information (see FIG. 5). The rate policing/re-marking logic 200 then provides the packet disposition information to the switch 220, thereby informing the switch 220 to pass packet unmodified on the network. In the event the rate policing/re-marking logic 200 determines that the packet is non-conforming (i.e., the token bucket value for the primary flow is negative after subtracting the packet byte count), the rate policing/re-marking logic 200 uses the asserted Drop bit in the selected primary flow action field to fill the corresponding field in the packet disposition information (see FIG. 5), and then provides the packet disposition information to the switch 220 to inform the switch 220 to drop the non-conforming packet from the network.

In a second example, the rate policing/re-marking logic 200 is configured to perform single-level accounting of a packet in a primary flow. In this example, the valid (V) bit in the aggregated flow ID format 1000 (see FIG. 10) is de-asserted, the Drop bit in the primary flow action fields AF0–AF7 is de-asserted, and the Whole Number (WN) bit in the primary flow action fields AF0–AF7 (see FIG. 12) is either asserted or de-asserted (both cases are considered below). Further, the PRI and DE bits in the primary flow action fields AF0–AF7 are set to the same values as in the ICoS field (see FIG. 4). In the event the rate policing/re-marking logic 200 determines that the packet is conforming, the rate policing/re-marking logic 200 stores the new token bucket value in the appropriate location of the flow record memory 322 for the primary flow. Next, the rate policing/re-marking logic 200 de-asserts the Drop bit and uses the original ICoS data to fill the ECoS field in the packet disposition information. The rate policing/re-marking logic 200 then stores a statistic indicating that the packet in the primary flow is passed on the network at the appropriate address of the statistics memory 328. Next, the rate policing/re-marking logic 200 provides the packet disposition information to the switch 220, thereby informing the switch 220 to pass the packet unmodified on the network. In the event the rate policing/re-marking logic 200 determines that the packet is non-conforming and the WN bit is de-asserted, the rate policing/re-marking logic 200 stores the new token bucket value in the appropriate location of the flow record memory 322 for the primary flow. If the token bucket underflows or goes from negative to positive, or if the WN bit is asserted, then the rate policing/re-marking logic 200 does not store the new token bucket value in the flow record memory 322. Next, the rate policing/re-marking logic 200 uses the Drop, PRI, and DE bits in the selected primary flow action field to fill the corresponding fields in the packet disposition information (see FIG. 5). In effect, the non-conforming packet is "re-marked" with the original ICoS parameter. The rate policing/re-marking logic 200 then stores a statistic indicating that the non-conforming packet is re-marked at the appropriate address of the statistics memory 328. The rate policing/re-marking logic 200 then provides the packet disposition information to the switch 220 to inform the switch 220 to pass the re-marked packet on the network.

In a third example, the rate policing/re-marking logic 200 is configured to perform single-level re-marking of a packet in a primary flow. In this example, the valid (V) bit in the aggregated flow ID format 1000 is de-asserted, the Drop bit in the primary flow action fields AF0–AF7 is de-asserted, and the Whole Number (WN) bit in the primary flow action fields AF0–AF7 is either asserted or de-asserted (both cases are considered below). Further, the PRI and DE bits in the respective primary flow action fields AF0-AF7 are set to conform to predetermined CoS parameters. In the event the rate policing/re-marking logic 200 determines that the packet is conforming, the rate policing/re-marking logic 200 stores the new token bucket value in the appropriate location of the flow record memory 322 for the primary flow. Next, the rate policing/re-marking logic 200 de-asserts the Drop bit and uses the ICoS data to fill the ECoS field in the packet disposition information. The rate policing/re-marking logic 200 then provides the packet disposition information to the switch 220, thereby informing the switch 220 to pass the packet unmodified on the network. In the event the rate policing/re-marking logic 200 determines that the packet is non-conforming and the WN bit is de-asserted, the rate policing/re-marking logic 200 stores the new token bucket value in the appropriate location of the flow record memory 322 for the primary flow. If the WN bit is asserted, then the rate policing/re-marking logic 200 does not store the new token bucket value in the flow record memory 322. Next, the rate policing/re-marking logic 200 uses the Drop, PRI, and DE bits in the selected primary flow action field to fill the corresponding fields in the packet disposition information. In this way, the non-conforming packet is re-marked with a new ECoS parameter. The rate policing/re-marking logic 200 then provides the packet disposition information to the switch 220 to inform the switch 220 to pass the re-marked packet on the network.

In a fourth example, the rate policing/re-marking logic 200 is configured to perform two-level policing/re-marking of a packet in a primary flow, which is a sub-flow of an aggregated packet flow. For example, such two-level policing/re-marking may be performed to enforce an ICoS contract specifying that a network user has a total bandwidth of 100 MB/s with 300 KB/s of high priority data traffic. Further, the ICoS contract may stipulate that any traffic above 100 MB/s is to be dropped from the network 102. In this case, the token bucket for the primary flow is set up to enforce the specified 300 KB/s data transmission rate and the token bucket for the aggregated flow is set up to enforce the specified 100 MB/s transmission rate.

In this fourth example, the valid (V) bit in the aggregated flow ID format 1000 is asserted. In the event the rate policing/re-marking logic 200 determines that the packet in the primary flow is non-conforming, the rate policing/re-marking logic 200 does not perform the token bucket operation for the aggregated flow. The rate policing/re-marking logic 200 then asserts the Drop bit in the packet disposition information and provides the packet disposition information to the switch 220 to inform the switch 220 to drop the packet from the network.

In the event the rate policing/re-marking logic 200 determines that the packet in the primary flow is conforming, the rate policing/re-marking logic 200 stores the new token bucket value in the appropriate location of the flow record memory 322 for the primary flow. Next, the rate policing/re-marking logic 200 performs token bucket processing for the aggregated flow. In the event the rate policing/re-marking logic 200 determines that the packet in the aggregated flow is conforming, the rate policing/re-marking logic 200 stores the new token bucket value in the appropriate location of the flow record memory 322 for the aggregated flow. It is noted that the rate policing/re-marking logic 200 may defer storing the new token bucket value for the primary flow in the flow record memory 322 until the token bucket processing results for the aggregated flow are known so as not to penalize the primary flow for traffic dropped by the aggregate. Next, the rate policing/re-marking logic 200 de-asserts the Drop bit and uses the data in the ICoS field to fill the ECoS field in the packet disposition information. The rate policing/re-marking logic 200 then provides the packet disposition information to the switch 220 to inform the switch 220 to pass the packet unmodified on the network.

In the event the rate policing/re-marking logic 200 determines that the packet in the aggregated flow is non-conforming, the WN bit is examined to determine whether to store the new token bucket value in the flow record memory 322 for the aggregated flow. If the WN bit is de-asserted, then the new aggregated token bucket value is stored. Otherwise, the new aggregated token bucket value is not stored. Next, the rate policing/re-marking logic 200 uses the Drop, PRI, and DE bits in the selected aggregated flow action field to fill the corresponding fields in the packet disposition information. The rate policing/re-marking logic 200 then provides the packet disposition information to the switch 220 to inform the switch 220 to pass the re-marked packet on the network.

In a fifth example, the rate policing/re-marking logic 200 is configured to perform two-level re-marking/re-marking of a packet in a primary flow, which is a sub-flow of an aggregated packet flow. For example, such two-level re-marking/re-marking may be performed to enforce an ICoS contract specifying that a network user has a total bandwidth of 100 MB/s including 300 KB/s of high priority traffic with any remaining traffic passed on an opportunistic basis, i.e., if there is enough bandwidth available in the aggregated flow.

In this fifth example, the valid (V) bit in the aggregated flow ID format 1000 is asserted, and the New bit in the action table format 1100 (see FIG. 11) is either asserted or de-asserted (both cases are considered below). Further, the Drop bits in the primary and aggregated action fields AF0–AF7 are de-asserted. In the event the rate policing/re-marking logic 200 determines that the packet in the primary flow is conforming, the rate policing/re-marking logic 200 stores the new token bucket value in the appropriate location of the flow record memory 322 for the primary flow. Further, the data in the ICoS field remains unmodified. In the event the rate policing/re-marking logic 200 determines that the packet in the primary flow is non-conforming, the rate policing/re-marking logic 200 optionally stores the new token bucket value for the primary flow depending on the value of the WN bit. Further, the PRI and DE bits from the selected primary action field are used to fill (i.e., re-mark) the ICoS field. If the New bit is asserted, then the PRI and DE bits from the selected primary action field are also used to select the aggregated flow action field during token bucket processing for the aggregated flow. If the New bit is de-asserted, then the original PRI and DE bits from the ICoS field are used to select the aggregated flow action field.

Next, the rate policing/re-marking logic 200 performs token bucket processing for the aggregated flow. In the event the rate policing/re-marking logic 200 determines that the packet in the aggregated flow is conforming, the rate policing/re-marking logic 200 stores the new token bucket value in the appropriate location of the flow record memory 322 for the aggregated flow. Next, the rate policing/re-marking logic 200 de-asserts the Drop bit and uses the data in the ICoS field to fill the ECoS field in the packet disposition information. The rate policing/re-marking logic 200 then provides the packet disposition information to the switch 220 to inform the switch 220 to pass the packet unmodified or re-marked on the network (depending on whether the packet in the primary flow is determined to be conforming or non-conforming). In the event the rate policing/re-marking logic 200 determines that the packet in the aggregated flow is non-conforming, the WN bit is examined to determine whether to store the new token bucket value in the flow record memory 322 for the aggregated flow. Next, the rate policing/re-marking logic 200 uses the Drop, PRI, and DE bits in the selected aggregated flow action field to fill (i.e., re-mark) the ECoS field in the packet disposition information. The rate policing/re-marking logic 200 then provides the packet disposition information to the switch 220 to inform the switch 220 to pass the re-marked packet on the network.

The presently disclosed method of performing rate policing and re-marking in a communications network is represented in pseudo code in FIGS. 13a–13b for a computer program written in a language such as C. It should be understood that the method steps depicted in FIG. 13 are merely exemplary and that alternative steps may be employed to enforce and/or monitor CoS contracts including terms for single or multiple classes of service. It is also understood that the method represented by the pseudo code is performed at an ingress node on the network configured to receive an incoming packet, extract header information from the packet including an ICoS parameter (CCOS), a primary flow ID, and a packet byte count (B), and use the extracted packet header information to perform flow record and token bucket processing on the packet.

As shown in FIG. 13a, a primary token bucket test is performed on the incoming packet. Specifically, B is subtracted from the token bucket value for the primary flow (PTB). If PTB−B<0, then the incoming packet fails to conform to the bandwidth requirements of the primary flow. CCOS is then used to fetch the primary action table entry (AT1) for the non-conforming packet. If Drop(AT1, CCOS) =True (i.e., if the Drop bit is asserted in AT1), then the packet is dropped from the network and the method is performed on the next incoming packet. If the Drop bit is de-asserted, then the packet is re-marked with a new class of service (NCCOS), which is obtained from AT1. Further, if the whole number (WN) bit is de-asserted in AT1, then PTB=PTB−B. Moreover, if PTB−B≧0, then PTB=PTB−B.

As shown in FIG. 13b, if V=False (i.e., if the Valid (V) bit is de-asserted in a corresponding aggregated flow ID for the incoming packet), then the primary flow is not a sub-flow of an aggregated flow and NCCOS is written in the header field of the corresponding outgoing packet. The method is then performed on the next incoming packet. If the V bit is asserted, then an aggregated token bucket test is performed on the incoming packet. Further, if UseNewCCOS=True (i.e., if the New bit is asserted in the corresponding action table data), then CCOS=NCCOS. Next, B is subtracted from the token bucket value for the aggregated flow (ATB). If ATB−B<0, then the incoming packet fails to conform to the bandwidth requirements of the aggregated flow. CCOS is then used to fetch the aggregated action table entry (AT2) for the non-conforming packet. If Drop(AT2, CCOS)=True (i.e., if the Drop bit is asserted in AT2), then the packet is dropped from the network and the method is performed on the next incoming packet. If the Drop bit is de-asserted, then the packet is re-marked with NCCOS, which is obtained from AT2. Further, if the whole number (WN) bit is de-asserted in AT2, then ATB=ATB−B. Moreover, if ATB−B≧0, then ATB=ATB−B. Finally, NCCOS is written in the header field of the outgoing packet, and the method is performed on the next incoming packet.

It will further be appreciated by those of ordinary skill in the art that modifications to and variations of the above-described dual use rate policer and re-marking logic may be made without departing from the inventive concepts disclosed herein. Accordingly, the invention should not be viewed as limited except as by the scope and spirit of the appended claims.

What is claimed is:

1. A method of performing rate policing and re-marking of one or more data units at an ingress node of a communications network, comprising the steps of:

receiving a data unit in a first data flow at the ingress node;

extracting information from a header field of the data unit including an indication of at least one class of service requirement for the first data flow and an indication of the length of the data unit from the data unit header field;

performing token bucket processing on the data unit to determine whether the data unit conforms to the class of service requirement for the first data flow, including the step of accessing a token bucket value for the first data flow and subtracting the data unit length from the token bucket value;

in the event the data unit does not conform to the class of service requirement for the first data flow, accessing one of a first plurality of actions to be taken on the non-conforming data unit at the ingress node based at least on the service class requirement of the first data flow, the first plurality of actions including re-marking the data unit with at least one new class of service requirement and dropping the data unit from the network; and in the event the data unit conforms to the class of service requirement for the first data flow, passing the conforming data unit on the network.

2. The method of claim 1 wherein the receiving step includes receiving respective data units in a plurality of first data flows at the ingress node, the respective data units being received using fair queuing.

3. An apparatus for performing rate policing and re-marking of one or more data units at an ingress node of a communications network, comprising:

a switch configured to receive a data unit in a first data flow at the ingress node, extract information from a header field of the data unit including an indication of at least one class of service requirement for the first data flow, and pass the data unit on the network in the event the data unit conforms to the class of service requirement for the first data flow; and rate policing and re-marking logic configured to perform token bucket processing on the data unit to determine whether the data unit conforms to the class of service requirement for the first data flow, access one of a first plurality of actions to be taken on the data unit at the ingress node based at least on the service class requirement of the first data flow in the event the data unit does not conform to the class of service requirement for the first data flow, the rate policing and re-marking logic is further configured to access one of the first plurality of actions from an action table using the indication of the service class requirement for the first data flow as at least part of a read address, wherein the first plurality of actions includes re-marking the data unit with at least one new class of service requirement and dropping the data unit from the network.

4. The apparatus of claim 3 wherein the action table includes a plurality of data entries, each data entry comprising a plurality of action fields for the first data flow.

5. A method of performing rate policing and re-marking of one or more data units at an ingress node of a communications network, comprising the steps of:

receiving a data unit in a first data flow at the ingress node;

extracting information from a header field of the data unit including an indication of at least one class of service requirement for the first data flow;

performing token bucket processing on the data unit to determine whether the data unit conforms to the class of service requirement for the first data flow;

in the event the data unit does not conform to the class of service requirement for the first data flow, accessing one of a first plurality of actions to be taken on the non-conforming data unit at the ingress node based at least on the service class requirement of the first data flow, the first plurality of actions including re-marking the data unit with at least one new class of service requirement and dropping the data unit from the network;

in the event the data unit conforms to the class of service requirement for the first data flow, passing the conforming data unit on the network;

determining whether the first data flow is a sub-flow of an aggregated data flow;

in the event the first data flow is a sub-flow of an aggregated data flow:

accessing a class of service requirement for the aggregated data flow, performing token buck processing on the data unit to determine whether the data unit conforms to the class of service requirement for the aggregated data flow, in the event the data unit does not conform to the class of service requirement for the aggregated data flow, accessing one of a second plurality of actions to be taken on the non-conforming data unit at the ingress node based at least one the service class requirement for the first data flow, the second plurality of actions including re-marking the data unit with at least one new class of service requirement and dropping the data unit from the network; and in the event the data unit conforms to the class of service requirement for the aggregated data flow, passing the conforming data unit on the network.

6. The method of claim 5 wherein the second performing step includes accessing a token bucket value for the aggregated data flow and subtracting the data unit length from the token bucket value for the aggregated data flow.

7. The method of claim 5 wherein the second accessing step includes accessing one of the second plurality of actions from an action table.

8. The method of claim 7 wherein the second accessing step includes accessing one of the second plurality of actions from the action table using the indication of the service class requirement for the first data flow as at least part of a read address.

9. An apparatus for performing rate policing and re-marking of one or more data units at an ingress node of a communications network, comprising:

a switch configured to receive a data unit in a first data flow at the ingress node, extract information from a header field of the data unit including an indication of at least one class of service requirement for the first data flow, and pass the data unit on the network in the event the data conforms to the class of service requirement for the first data flow; and rate policing and re-marking logic configured to perform token bucket processing on the data unit to determine whether the data unit conforms to the class of service requirement for the first data flow, access one of a first plurality of actions to be taken on the data unit at the ingress node based at least on the service class requirement of the first data flow in the event the data unit does not conform to the class of service requirement for the first data flow, wherein the rate policing and re-marking logic is further configured to determine whether the first data flow is a sub-flow of an aggregated data flow, in the event the first data flow is a sub-flow of an aggregated data flow:

access a class of service requirement for the aggregated data flow, perform token bucket processing on the data unit to determine whether the data unit conforms to the class of service requirement for the aggregated data flow, in the event the data unit does not conform to the class of service requirement for the aggregated data flow, access one of a second plurality of actions to be taken on the non-conforming data unit at the ingress node based at least one the service class requirement for the first data flow, the second plurality of actions including re-marking the data unit with at least one new class of service requirement and dropping the data unit from the network; and wherein the switch is further configured to pass the data unit on the network in the event the data unit conforms to the class of service requirement for the aggregated data flow;

wherein the first plurality of actions includes re-marking the data unit with at least one new class of service requirement and dropping the data unit from the network.

10. The apparatus of claim 9 wherein the rate policing and re-marking logic is further configured to access one of the second plurality of actions from an action table using the indication of the service class requirement for the first data flow as at least part of a read address.

11. The apparatus of claim 10 wherein the action table includes a plurality of data entries, each data entry comprising a plurality of action fields for the aggregated data flow.

12. A method of performing rate policing and re-marking of one or more data units at an ingress node of a communications network, comprising the steps of:

receiving a data unit in a first data flow at the ingress node;

extracting information from a header field of the data unit including an indication of at least one class of service requirement for the first data flow;

performing token bucket processing on the data unit to determine whether the data unit conforms to the class of service requirement for the first data flow;

in the event the data unit does not conform to the class of service requirement for the first data flow, accessing one of a first plurality of actions to be taken on the non-conforming data unit at the ingress node based at least on the service class requirement of the first data flow from an action table, the first plurality of actions including re-marking the data unit with at least one new class of service requirement and dropping the data unit from the network; and in the event the data unit conforms to the class of service requirement for the first data flow, passing the conforming data unit on the network.

13. The method of claim 12 wherein the accessing step includes accessing one of the first plurality of actions from the action table using the indication of the service class requirement for the first data flow as at least part of a read address.

* * * * *